Figure 1:
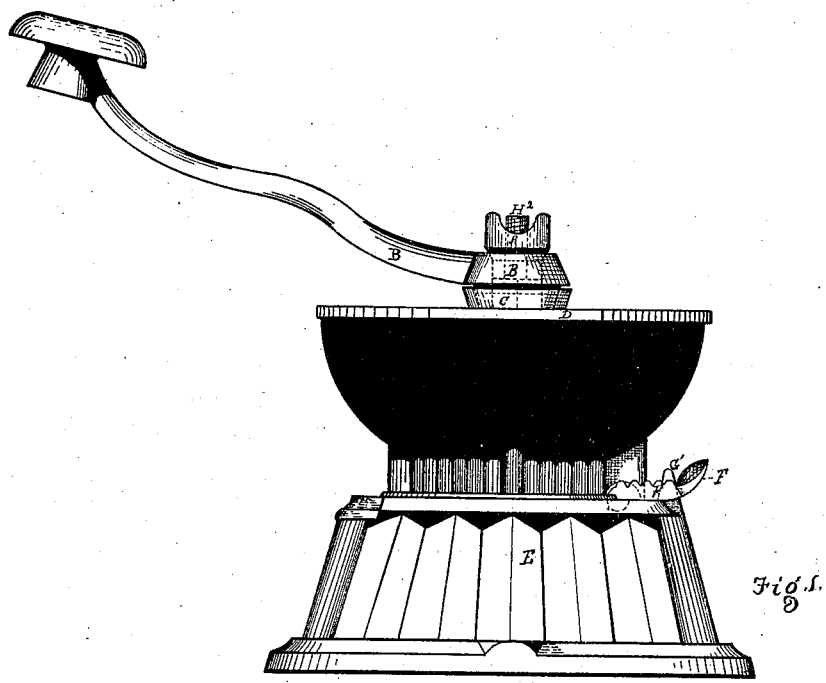
Figure 2:
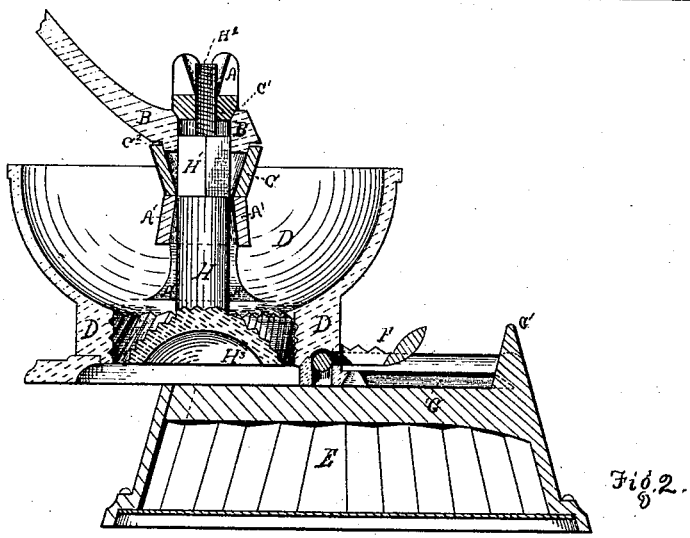

C. ADAMS.
COFFEE AND SPICE MILLS.

No. 179,885. Patented July 18, 1876.

Witnesses

J. H. Baldwin
Harry J. Schlitz

Inventor

Calvin Adams

N. PETERS, PHOTO-LITHOGRAPHER, WASHINGTON, D. C.

UNITED STATES PATENT OFFICE.

CALVIN ADAMS, OF PITTSBURG, PENNSYLVANIA.

IMPROVEMENT IN COFFEE AND SPICE MILLS.

Specification forming part of Letters Patent No. 179,885, dated July 18, 1876; application filed December 20, 1875.

*To all whom it may concern:*

Be it known that I, CALVIN ADAMS, of the city of Pittsburg, in the county of Allegheny and State of Pennsylvania, have invented an Improvement in Coffee and Spice Mills, of which the following is a specification:

Coffee and spice mills have been so long known and used that no description of them is necessary beyond the parts which relate to my invention.

The mill shown in the drawings has the ordinary hopper and grinder, made of cast-iron or other suitable material. The hopper D is attached to the movable lid or top G by means of screws or rivets, or it may be, if the manufacturer prefers, cast with the top, the hopper and lid thus being formed in one piece. In the place of the ordinary wooden boxes used for coffee and spice mills having a drawer in them to receive the ground substance as it falls from the mill, I make the boxes of metal, usually cast-iron, which can be cheaply made, and in size corresponding to the dimensions of the hopper. The upper edges of the box E are grooved, so that the lid G can slide back and forth freely, and across the upper center a bar may be formed for the purpose of additional support to the combined lid and mill. On the upper back edge of the box E I form a lug or projection, C', of sufficient length to act as a bolt or fastener for the catch F, which is curved upward at its loose end, so that it will easily slide over the projection C', when the combined lid and mill are pushed to their place on the box, and the catch will then fasten itself. This catch may be secured to the lid by making suitable openings in the lid, into which one end of the catch is dropped, as shown in the drawing. Other methods of fastening the lid to the box will readily suggest themselves to the manufacturer; but the sliding motion of the lid should be preserved, as a rotary or hinged motion renders the lid liable to displacement in case of a jar to the mill, or a sudden backward turning of the handle.

The advantages of this invention are, that the mill can be more cheaply made than in the ordinary way, and, when made, is more convenient in use, as well as out of use, and more durable than the ordinary mill.

Cast-iron coffee-mills are ordinarily made with the arch A' A' reaching nearly to, or extending above, the upper rim of the hopper D; and in the process of casting the end of the arch becomes chilled and very hard, so that the handle B, which should be made of softer iron, is soon worn out at the point where it turns upon the arch. Washers are frequently placed between the handle and the arch to preserve the handle; but they also soon wear out.

In my invention the arch A is made considerably lower than the hopper, while the shaft H of the grinder projects the ordinary distance above the hopper, so as to receive the handle. Before the handle is attached to the shaft H I put over it a thimble-shaped ring, C, about half an inch in length, cast of hard iron, the smaller end of which fits as closely to the shaft as may be necessary to make the ring turn with the shaft and handle.

The hole in the handle is made square, and large enough to pass loosely over the shaft H, while the upper sides of the opening C¹ are countersunk, so that the regulating-nut A, which is cone-shaped on its lower side, can pass into the opening, and hold the handle in its proper position, while at the same time it regulates the set of the mill. On the lower side of the handle, and around its opening C¹, I form the small projection C², which fits into the thimble C, and serves both to hold the handle in its place on the thimble, and cause the thimble to turn with the shaft and handle.

This invention forms a very cheap remedy for what has heretofore been a serious defect in cast-iron coffee-mills. The two hard surfaces, turning upon each other in the manner shown, will not wear out, and this part of the mill can be made as durable as the grinder or any other portion of it.

I am aware that the connecting of the hopper-top of a coffee-mill to a sheet-metal or other receptacle for coffee, by means of open slots, in connection with lugs, when actuated by a rotary motion of one or the other part, is an old device, having been used, substantially, by Calvin Adams and John Roggen since 1834, and lately by Schultze, June 10, 1873, and Webb, September 28, 1875.

I claim as my invention—

1. The box or receptacle E, provided with the upper grooved edges and bar, and the projection C¹, in combination with the square or oblong base or lid G of the hopper D, and the curved and slotted catch F, the whole constructed and operated as described, and for the purpose set forth.

2. The combination of the square-shaped opening of the handle, with its countersunk upper edge, with the inverted hollow cone or thimble shaped ring C and the thumb-nut A, fitted to the shaft and handle of a coffee or spice mill, as shown and described, and for the purpose set forth.

CALVIN ADAMS.

Witnesses:
J. H. BALDWIN,
H. J. SCHLUTZ.